United States Patent
Kimura

[15] 3,651,747
[45] Mar. 28, 1972

[54] FILM MAGAZINE UNLOADING MECHANISM IN A CAMERA

[72] Inventor: Shuji Kimura, Setagaya, Japan
[73] Assignee: Nippon Kogaku K.K., Tokyo, Japan
[22] Filed: Mar. 4, 1971
[21] Appl. No.: 121,003

[30] Foreign Application Priority Data

Mar. 10, 1970 Japan.................................45/22605

[52] U.S. Cl. ..........................................................95/31 R
[51] Int. Cl. ...................................G03b 19/04, G03b 17/26
[58] Field of Search..................95/31 R, 31 CA, 31 C, 34 R, 95/34 A; 352/72, 76, 78

[56] References Cited

UNITED STATES PATENTS

| | | | |
|---|---|---|---|
| 2,492,900 | 12/1949 | Swenson | 95/31 C X |
| 1,363,217 | 12/1920 | Backus | 95/31 C |
| 3,459,110 | 8/1969 | Papke et al. | 95/31 R |
| 3,543,664 | 11/1970 | Kremp et al. | 95/31 R |

Primary Examiner—John M. Horan
Assistant Examiner—Kenneth C. Hutchinson
Attorney—Harry G. Shapiro

[57] ABSTRACT

A camera using a film magazine and provided with a film magazine unloading mechanism which enables the film magazine to be readily taken out of a film magazine receiving chamber in the camera without the need to detach the camera from a tripod or other support means and without the danger of injuring the film magazine and/or the film magazine receiving chamber. After the film has been exposed, rotating an operating knob on the camera body rotates one of the two concentric cylinders forming the magazine. This creates a light seal for the enclosed film by moving the film exit slits of the cylinders out of alignment. Rotating the knob further then objects the magazine from the camera through the opened camera back.

1 Claims, 14 Drawing Figures

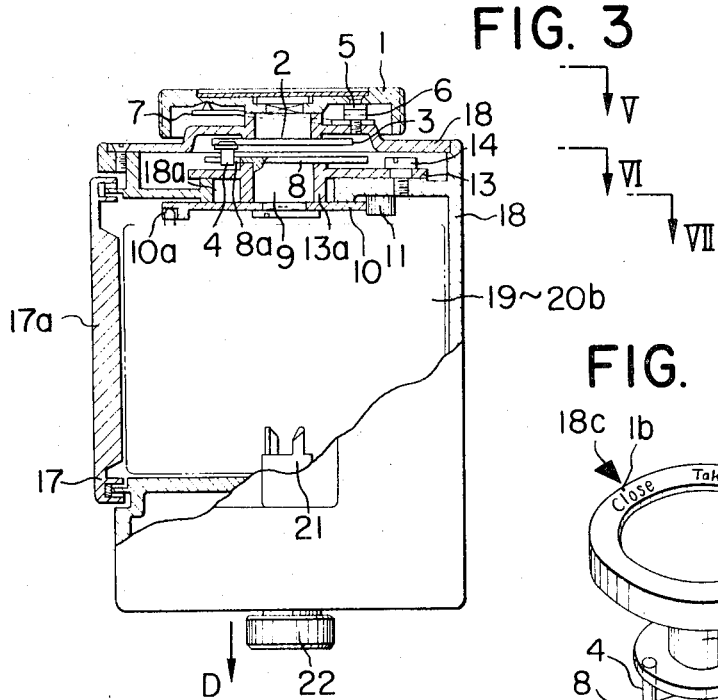
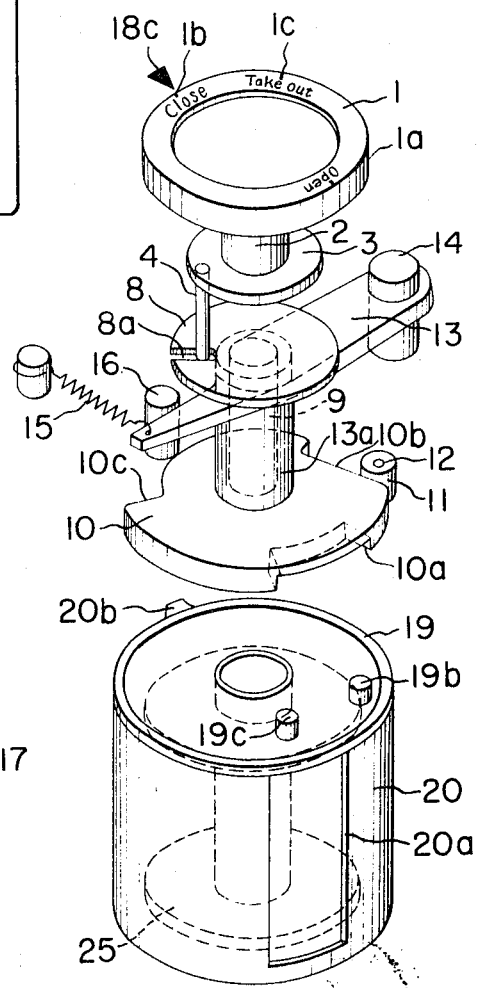
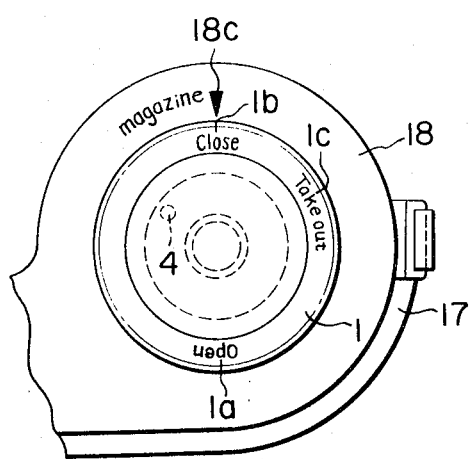

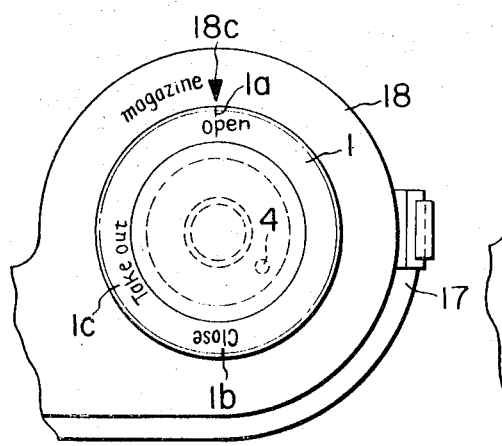
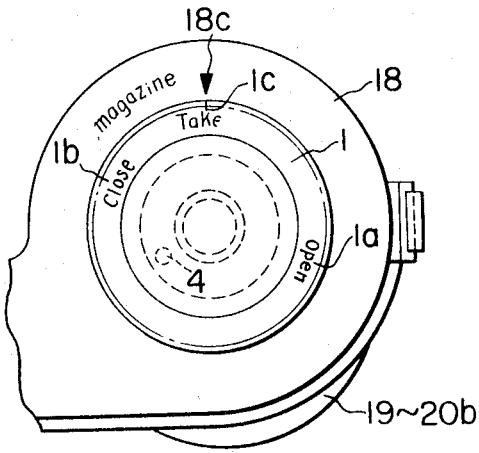
FIG. 5A  FIG. 5B
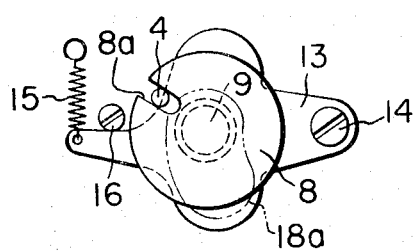
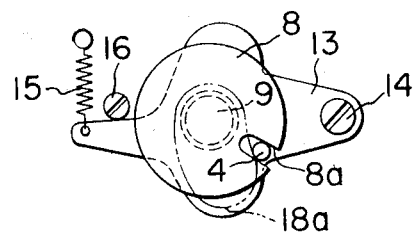
FIG. 6  FIG. 6A
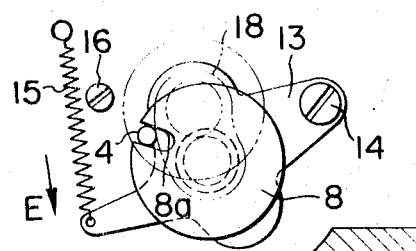
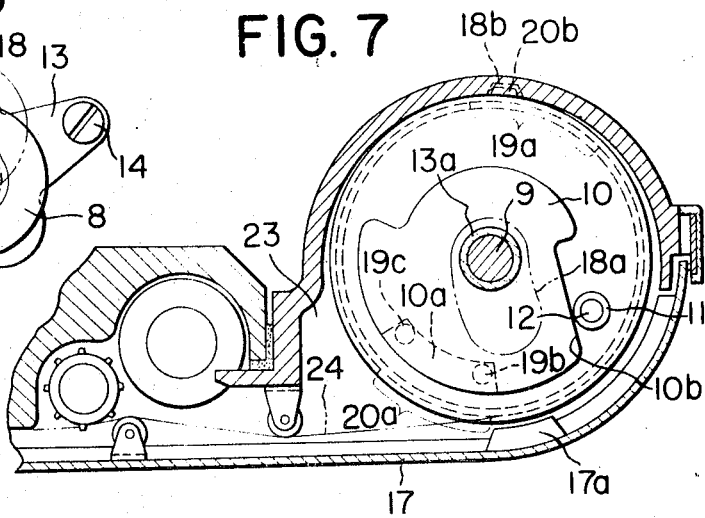
FIG. 6B  FIG. 7

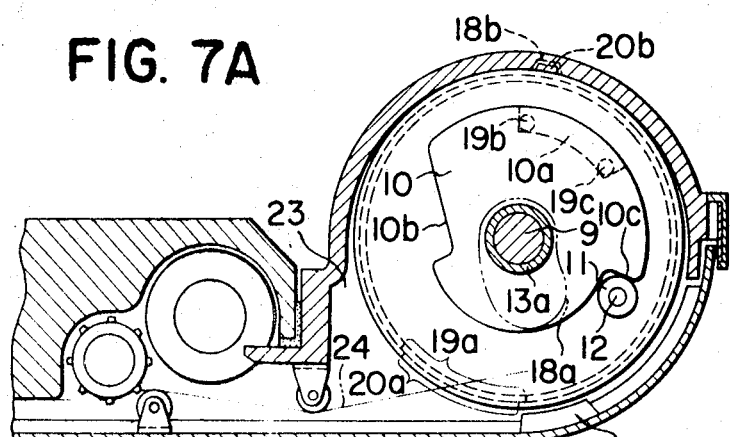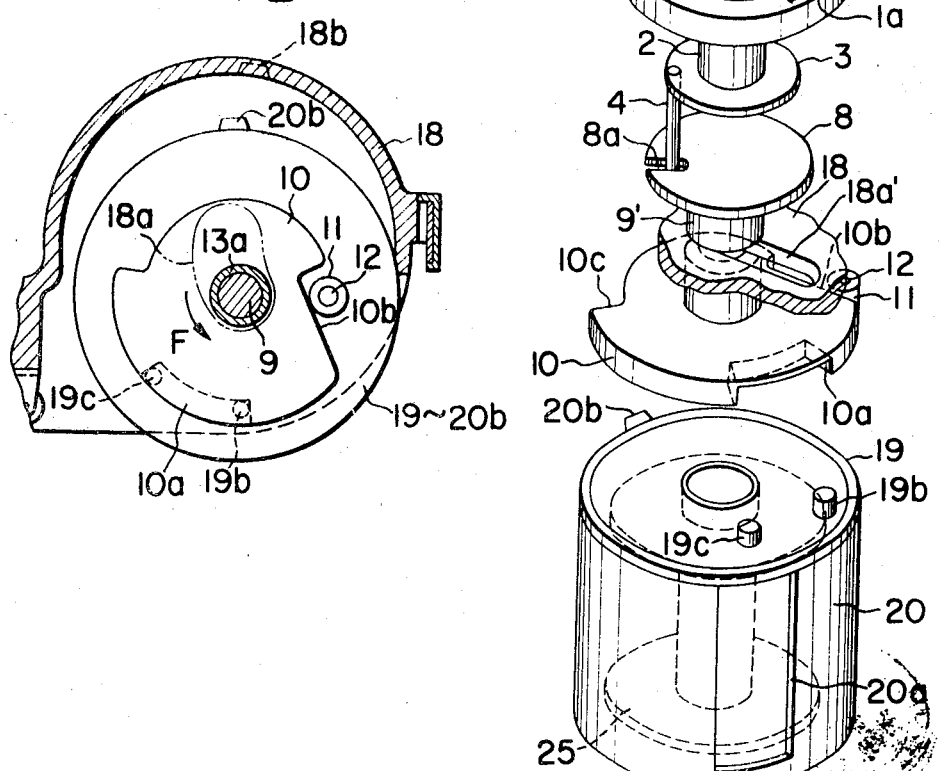

FILM MAGAZINE UNLOADING MECHANISM IN A CAMERA

BACKGROUND OF THE INVENTION

1. Field of the Invention

This invention relates to a film magazine unloading mechanism in cameras of the type using a film magazine having film transport slits which can be opened and closed, and more particularly to such mechanism in cameras of the type using a large film magazine capable of containing therein a great deal of film.

2. Description of the Prior Art

In the cameras of the conventional type which use a large film magazine, no special means has been provided for unloading the film magazine from the film magazine receiving chamber, and the removal of the film magazine had to be accomplished by opening the back cover of the camera and then inclining the camera so as to permit the film magazine to come out of its own weight. Such a method of the film magazine unloading has been very little practical in that it involves very much labor and trouble because most cameras of the described type employ a motor-driven film rewind system and are usually so bulky and weighty that they must often be held on fixed support means such as tripod or other suitable pedestal for photographing. Thus, for the removal of the film magazine from the film magazine receiving chamber, it has usually been the practice to maintain the camera in such supported position and take the film magazine out of the chamber by the use of a suitable tool such as an elongated rod or the like. This procedure has encountered much difficulty in safely removing the film magazine and further involved the possible danger of injuring the film magazine and/or the film magazine receiving chamber due to the use of the tool.

SUMMARY OF THE INVENTION

The present invention seeks to overcome to the foregoing drawbacks and provide a camera provided with a film magazine unloading mechanism which enables a film magazine to be readily taken out of a film magazine receiving chamber in the camera even when the camera is supported on a tripod or other fixed support means.

According to the present invention, the camera comprises a camera housing, and a film magazine removably mounted in a film receiving chamber provided within the housing. The film magazine includes an inner and outer cylinders each having a slit formed in the side wall thereof so as to provide a film transport opening, the inner and outer cylinders being rotatable relative to each other to thereby bring the slits into registered and unregistered positions. These slits are adapted to form film transport openings when they are registered with each other, and to be closed when they are unregistered with each other. An operating member is rotatably mounted on a wall of the housing for opening and closing the film transport openings in the film magazine and for projecting the magazine outwardly of the housing. The operating member is rotatable to a first, a second and a third position. An intermediate member is provided in the housing for transmitting the rotational movement of the operating member to the film magazine as two movements including a rotational movement and a linear movement directed outwardly of the housing, the intermediate member having connecting means for detachably connecting it to the film magazine. Thus, when the operating member is in the first position the film magazine has its inner and outer cylinders positioned so as to open the film transport openings. When the operating member is rotated from the first position to the second position one of the inner and outer cylinders forming the magazine is rotated relative to the other to thereby close the film transport openings. When the operating member is rotated from the second position to the third position the intermediate member is displaced to thereby displace the film magazine outwardly of the housing.

BRIEF DESCRIPTION OF THE DRAWINGS

The invention will be fully understood from the following detailed description of preferred embodiments thereof taken in conjunction with the accompanying drawings, in which:

FIG. 3 is a cross-sectional view taken along line III—III of FIG. 2;

FIG. 4 is an exploded perspective view showing the essential parts of the mechanism according to an embodiment of the present invention;

FIG. 5 is a plan view taken along plane V of FIG. 3, with the film inlet-outlet slits of the film magazine being closed;

FIG. 5A is a view similar to FIG. 5 but showing the slits in open position;

FIG. 5B is a view similar to FIG. 5 but showing a position ready to take the film magazine out of the camera; FIG. 6 is a plan view taken along plane VI of FIG. 3, with the film inlet-outlet slits being closed;

FIG. 6A is a view similar to FIG. 6 but showing the slits in open position;

FIG. 6B is a view similar to FIG. 6 but showing the position ready to take the film magazine out of the camera;

FIG. 7 is a plan view taken along plane VII of FIG. 3, with the film inlet-outlet slits of the film magazine being closed;

FIG. 7A is a view similar to FIG. 7 but showing the slits in open position;

FIG. 7B is a view similar to FIG. 7 but showing the position ready to take the film magazine out of the camera; and FIG. 8 is an exploded perspective view showing the essential parts of the film magazine unloading mechanism according to another embodiment of the present invention.

DESCRIPTION OF THE PREFERRED EMBODIMENTS

Figure 2:
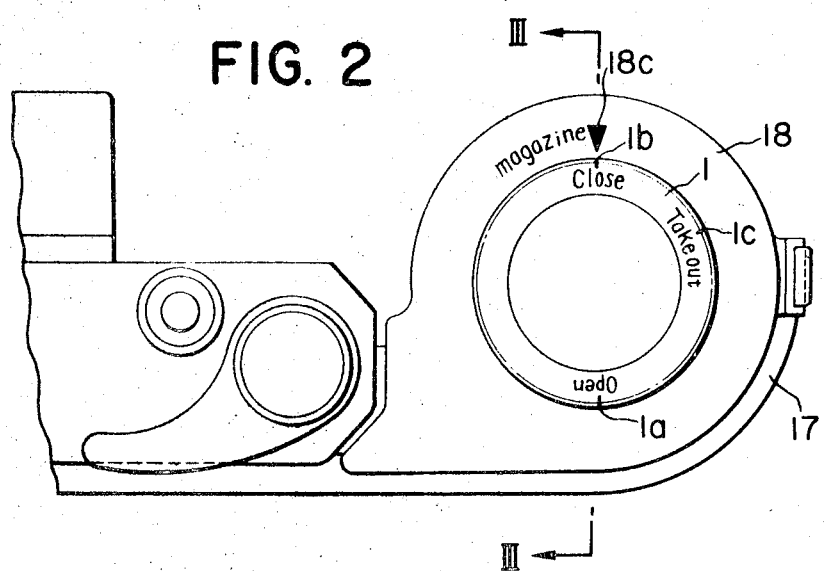
FIG. 2 is a plan view of the same camera with the back cover thereof being closed.

Referring first to FIGS. 3 and 4, reference numeral 1 designates an operating knob rotatably mounted on a camera body 18 by means of a shaft 2 for opening and closing the film inlet-outlet slits of a large film magazine (to be described) containing therein a great length of film. The operating knob 1 has various marks 1a ("Open"), 1b ("Close") and 1c ("Take out") formed in the upper end face thereof, as shown in FIG. 2. A disc 3 having a connecting pin 4 studded therein is secured to the shaft 2 at the upper end thereof. Stop pins 5 and 6 are studded in the operating knob 1 and the camera body 18, respectively, to limit the rotation of the operating knob 1. A click spring 7 is provided on the camera body 18 and adapted to successively engage recesses in the operating knob 1 so as to correspond to the marks 1a—1c thereon. A flange 8 is securely mounted at one end of a shaft 9 rotatably fitted in a pivotally movable lever 13 to be described, and this flange has a radial cut-away 8a formed to receive therein the connecting pin 4.

A member 10 for opening and closing the film inlet-outlet slits is secured to the shaft 9 at the other end thereof, and has a mating portion 10a for engaging the interlocking pins 19b and 19c of the film magazine and rotation limiting portions 10b and 10c for engaging a roller 11 mounted on the camera body 18. The roller 11 is adapted to limit the rotation of the film inlet-outlet opening and closing member 10 to the range defined between the marks 1a and 1b on the operating knob 1, as shown in FIGS. 4, 5A, 5B, 7A and 7B. The pivotally movable lever 13 is mounted on the camera body for rotation about a shaft 14 and, as shown in FIGS. 3 and 7A—B, a cylindrical member 13a fitted over the shaft 9 extends through a slot 18a formed in the camera body 18. The pivotally movable lever 13 is arranged such that it is biased clockwise by a spring 15 so as to engage a stop pin 16, whereby the shaft 9 comes into coaxial relationship with the shaft 2.

Figure 1:
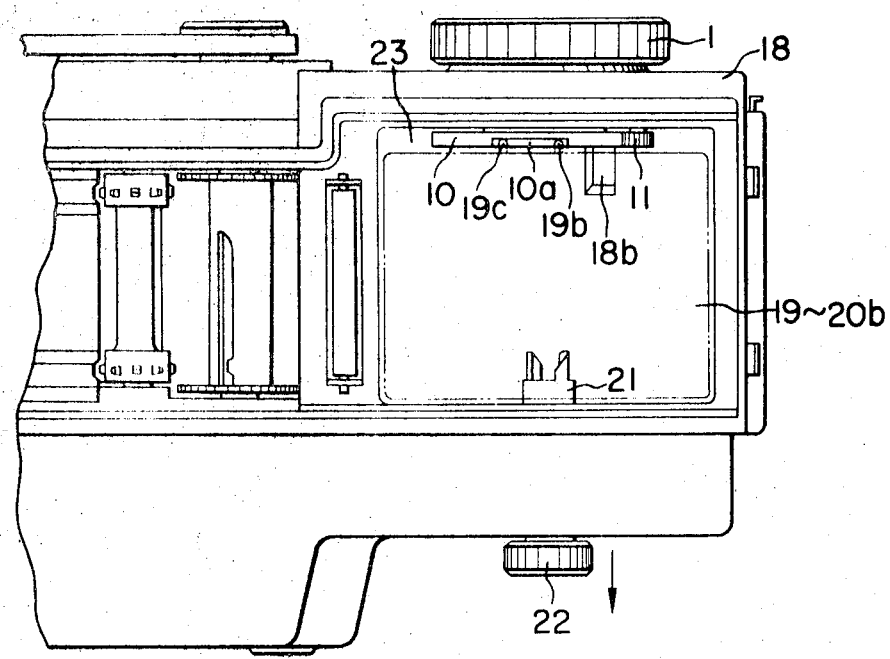
FIG. 1 is a partly cut-away rear view showing the appearance of a camera provided with the film magazine unloading mechanism according to an embodiment of the present invention, with the back cover of the camera being opened.

As shown in FIGS. 2, 3 and 7A, the back cover 17 of the camera is formed with a film magazine keep means 17a. The large film magazine containing therein a great length of film is of the known type and includes an inner cylinder 19, which accommodate therein a spool 25 and has a film inlet-outlet slit 19a and interlocking pins 19b and 19c, as shown in FIG. 7A. The film magazine further includes an outer cylinder 20, which is formed with a film inlet-outlet slit 20a and a projection 20b engageable with a recess 18b in the camera body 18 to prevent the rotation of the outer cylinder 20. The inner and outer cylinders 19 and 20 in combination provide a light-proof effect for a film 24 wound on the spool 25, and the inner cylinder 19 is rotatable relative to the outer cylinder 20 by means of the interlocking pins 19b and 19c so that the rotation of the inner cylinder 19 relative to the outer cylinder 20 causes a change in the relative position between their respective film inlet-outlet slits 19a and 20a so as to open and close these slits. As partly shown in FIGS. 1 and 3, there is provided a film take-up shaft 21 whose inner end is engageable with the spool 25 within the film magazine cylinders 19–20 to thereby take up the film. A knob 22 is secured to the outer end of the film take-up shaft 21 so that the shaft 21 may be disengaged from the spool 25 when the knob 22 is pulled out of the camera body 18 in the direction indicated by arrow D in FIG. 3.

In operation, the back cover 17 of the camera is opened (FIG. 1) and the knob 22 with the shaft 21 is pulled in the direction D, whereafter the film magazine assembly 19–20–25 with its film inlet-outlet slits 19a–20z in closed position is inserted into a film magazine receiving chamber 23 formed within the camera. Thereupon, the pins 19b and 19c of the film magazine engage the mating portion 10a of the film inlet-outlet opening-closing member 10 while the projection 20b of the outer film magazine cylinder 20 engages the recess 18b in the camera body 18, as shown in FIG. 7A, thereby preventing the rotation of the outer cylinder 20. The knob 22 is then forced inwardly to engage the film take-up shaft 21 with the spool in the film magazine, whereafter the back cover 17 of the camera is closed. Subsequently, the operating knob 1 for opening and closing the film inlet-outlet slits is rotated clockwise until the mark "Open" (1a) thereon is registered with a reference mark 18c shown as a black triangle provided on the camera body 18 (FIG. 5A). As seen in FIG. 4, the described clockwise rotation of the operating knob 1 is transmitted to the flange 8, shaft 9 and film inlet-outlet opening-closing member 10 through the engagement between the connecting pin 4 on the disc 3 integral with the knob 1 and the recess 8a formed in the flange 8, so that the member 10 is also rotated clockwise and the inner film magazine cylinder 19 is in turn rotated clockwise through the engagement between the mating portion 10a of the member 10 and the interlocking pins 19b and 19c of the film magazine. Thus, there is attained the position as shown in FIG. 7A, where the film inlet-outlet slit 19a of the inner magazine cylinder 20 is registered with the film inlet-outlet slit 20a of the outer magazine cylinder 20 so as to readily allow the movement or take-up of the film 24. The film magazine keep means 17a of the camera's back cover 17 acts to prevent the film magazine from raising itself when the slits 19a and 20a of the film magazine are opened or closed.

When the film magazine assembly 19–20–25 is to be taken out of the camera upon completion of the photographing operation, the operating knob 1 for opening and closing the film inlet-outlet slits is rotated counter-clockwise from the position as shown in FIG. 5A, 6A or 7A, until the mark "-Close" (1b) is registered with the triangular reference mark 18c of the camera. Thus, the position as shown in FIG. 5B, 6B or 7B is reached through a process converse to that described above. In this position, the film inlet-outlet slits 19a and 20a of the inner and outer film magazine cylinders 19 and 20 are diametrically opposed to prevent the entry of light into the film magazine assembly 19–20–25. At the same time, the film inlet-outlet opening-closing member 10 is prevented from its counter-clockwise rotation by the engagement between the rotation limiting portion 10b and the roller 11. The camera's back cover 17 is then opened and the knob 22 is pulled outwardly, whereafter the operating knob 1 is further rotated counter-clockwise until the mark "Take out" (1c) is registered with the triangular reference mark 18c of the camera (FIG. 5B). This counter-clockwise rotation of the operating knob 1 is imparted through the connecting pin 4 to the flange 8, shaft 9 and film inlet-outlet opening-closing member 10, whereas the member 10 is now limited in counter-clockwise rotation by the roller 11 and therefore, the lever 13 is swung counter-clockwise about the shaft 14 against the force of spring 15 so that the member 10 is displaced along the roller 11 in a direction indicated by arrow E (FIG. 6B).

Thus, together with the members 8, 9 and 10, the film magazine assembly 19–20–25 is moved in the same direction as the direction E through the engagement between the interlocking pins 19b, 19c and the mating portion 10a of the member 10, until the film magazine is partly projected outwardly of the camera body 18 so as to be readily taken out, as shown in FIG. 7B.

Referring to FIG. 8, there is shown another embodiment of the present invention. The camera body 18 has a guide slot 18a' formed therein and oriented to permit the removal of the film magazine 19–20–25, similarly to the guide slot 18a in the previous embodiment. A shaft 9' having a flange 8 at one end and a film inlet-outlet opening-closing member 10 at the other end is rotatably an slidably fitted in the guide slot 18a'. This alternative embodiment is such that shaft 9' becomes coaxial with the shaft 2 when the film magazine assembly 19–20–25 is positioned within the film magazine receiving chamber 23 in the camera. The other parts of this embodiment are similar in construction to those of the previously described embodiment.

To open or close the film inlet-outlet slits 19a and 20a of the film magazine, the operating knob 1 for opening and closing the slits may be rotated until the mark "Open" (1a) or the mark "Close" (1b) is registered with the reference mark 18c on the camera body, in the same way as described above. To take out the film magazine from the magazine receiving chamber 23, the operating knob 1 may be rotated until the mark "Take out" (1c) is registered with the camera's reference mark 18c, whereupon the film inlet-outlet opening-closing member 10 is limited in rotation by the roller 11 in the same manner as described with respect to the previous embodiment and therefore, the flange 8, shaft 9' and member 10 slide along the guide slot 18a' in the direction for discharging the film magazine so that the film magazine 19–20–25 is projected outwardly of the film magazine receiving chamber 23 in the same manner as shown in FIG. 7B. Thus, the film magazine can be readily taken out of the chamber.

Although both embodiments have been shown and described with respect to the film take-up chamber, it will be apparent that the present invention i also applicable to the film supply chamber.

As has been described above, the present invention can project the film magazine outwardly of the camera body by simply adding a few members to the conventional mechanism for opening and closing the film inlet-outlet slits of the film magazine, so that the film magazine can be readily taken out with the camera maintained supported on a tripod or other fixed support means. Thus, replacement of the film magazine can always be effected quickly and safely without the need to detach the camera from the support means or without the danger of injuring the film magazine and/or the film magazine receiving chamber as is experienced when the magazine is forced out with the camera attached to the support means. Thus, the present invention is especially useful for cameras of the type using a large film magazine containing therein a great deal of film.

I claim:

1. A camera of the type using a film magazine comprising:
   i. a film housing on the camera body;

ii. a film magazine removably mounted with respect to said housing, said film magazine including an inner and an outer cylinder each having a slit formed in the side wall thereof so as to provide a film transport opening, said inner and outer cylinders being rotatably relative to each other to thereby bring said slits into open and closed states, said slits being adapted to form film transport openings when they are registered with each other and to be closed when they are unregistered with each other;

iii. an operating member rotatably mounted on a wall of said housing for opening and closing said slit and for bringing said magazine outwardly of said housing after said slit is closed, said operating member being rotatable from a first position in which said film magazine has its inner and outer cylinders positioned so as to open said film transport openings, to a second position in which one of said inner and outer cylinders forming said magazine is rotated relative to the other to thereby close said slit, and successively to a third position in which said film magazine is displaced; and iv. an intermediate member provided in said housing for transmitting the rotational movement of said operating member to said film magazine as two movements including a rotational movement and a linear movement directed outwardly of said housing, said intermediate member having connecting means for detachably connecting it to said film magazine;

thereby when said operating member is rotated from said second position to said third position said intermediate member is displaced to displace said film magazine outwardly of said housing.

* * * * *